UNITED STATES PATENT OFFICE 2,457,079

STABILIZATION OF 2-THENYL CHLORIDE

Ferdinand B. Zienty, St. Louis, Mo., assignor to Monsanto Chemical Company, St. Louis, Mo., a corporation of Delaware No Drawing. Application October 18, 1946, Serial No. 704,287

16 Claims. (Cl. 260—329)

This invention relates to the stabilization of 2-thenyl chloride and more particularly to a novel composition comprising 2-thenyl chloride and a stabilizer therefor.

2-thenyl chloride is potentially a very useful intermediate because of its great reactivity and resemblance in certain respects to benzyl chloride. However, unlike benzyl chloride, 2-thenyl chloride is relatively unstable at normal and subnormal temperatures, and storage of the material at room temperature or at lower temperature is unfeasible because the material resinifies very readily to form a black resin. Even the storage of 2-thenyl chloride at 0° C. or below does not avoid this decomposition. Moreover, 2-thenyl chloride is highly reactive and combines readily with a large number of basic substances such as aniline, methyl aniline, dimethyl aniline, trimethyl amine, pyridine, and other amines, thereby depleting the 2-thenyl chloride and rendering it unavailable for desired reactions.

One of the objects of the present invention is to provide a novel composition comprising 2-thenyl chloride having incorporated therein certain amines which stabilize the 2-thenyl chloride substantially without depleting the activity of the 2-thenyl chloride.

Another object is to provide a novel method for stabilizing 2-thenyl chloride.

Further objects will become apparent from the following description and examples.

According to the present invention, generally stated, a composition exhibiting marked stability at normal and subnormal temperatures and having the full activity of freshly prepared 2-thenyl chloride is provided by incorporating with 2-thenyl chloride 0.5–5%, or even more, for example 10–15%, and desirably 1–2% by weight of an amine having the formula:

in which R represents hydrogen, alkyl, cycloalkyl, or aralkyl radicals, and $R_1$ and $R_2$ each represent an alkyl radical containing at least 8 carbon atoms, a cycloalkyl radical containing at least 5 carbon atoms in its ring structure or an aralkyl radical, $R_1$ and $R_2$ being similar or dissimilar radicals, provided, however, that when R is hydrogen and $R_1$ and $R_2$ are alkyl radicals, the $R_1$ and $R_2$ must each contain at least 10 carbon atoms.

In order to provide maximum stability in the composition of the present invention, it is desirable to eliminate from the 2-thenyl chloride substantially all of the free acidity which may be present therein and also to render the material substantially anhydrous, for example, to the extent of containing less than 0.5% moisture and desirably less than 0.2% moisture. This may be accomplished, for example, by washing 2-thenyl chloride with a cold aqueous solution containing 5% by weight of sodium bicarbonate, thereafter washing the 2-thenyl chloride with cold water, for example, ice water, and recovering the 2-thenyl chloride in substantially anhydrous form by fractional distillation under reduced pressure. To the fractionally distilled 2-thenyl chloride is added an amine of the aforescribed type in amounts as hereinbefore described.

The 2-thenyl chloride composition thus obtained has been found to be stable for more than 9 months at 5° C., more than 3 months at 25° C., and as long as 3 months at 42° C. Moreover, the 2-thenyl chloride composition thus prepared has been found to possess substantially the reactivity of freshly distilled 2-thenyl chloride and may be employed in chemical reactions in substantially the stoichiometric amounts based upon the content of 2-thenyl chloride employed in the preparation of the composition of the present invention.

Illustrative of the amines suitable for the preparation of the novel composition of the present invention, are dicyclohexylamine, a mixture of N-alkyl-N-benzyl-cyclohexylamines in which the alkyl radicals contain 8 to 18 carbon atoms, a mixture of N-alkyl-dicyclohexylamines in which the alkyl radicals contain 8 to 18 carbon atoms, a mixture of N-alkyl-dibenzylamines in which the alkyl radicals contain 8 to 18 carbon atoms, N-methyl-dicyclohexylamine, N-methyl-dibenzylamine, dibenzylamine, didodecylamine, N-methyl-dioctylamine, N - 2 - ethylhexyl) - dicyclopentylamine, N - methyl - dicyclopentylamine, N - (2-ethylhexyl) - dicyclohexylamine, N - (2 - ethylhexyl) - dibenzylamine, N - methyl - dinaphthyl-methyl amines, and di-(cyclohexyl-cyclohexyl)-amine.

The following examples will serve to illustrate the novel compositions of the present invention and the preparation thereof. These examples are to be construed merely as illustrative and not as limiting the present invention except as defined in the appended claims.

*Example I*

A quantity of 2-thenyl chloride was washed with cold 5% sodium bicarbonate solution to remove free acidity. The washed material was then washed with ice water and fractionally distilled under reduced pressure. To the acid-free, substantially anhydrous 2-thenyl chloride thus obtained, was added 1% by weight of dicyclohexylamine. The composition thus obtained was stored for more than 3 months at 40–45° C., during which time only a light brown coloration developed in the composition. In contrast, an unstabilized quantity of acid-free, substantially anhydrous 2-thenyl chloride stored at 40–45° C. turned dark within 2–3 days and decomposed to a black resin in a period of 7–14 days. To additional quantities of freshly distilled, acid-free anhydrous 2-thenyl chloride were added respectively 0.5%, 2%, 5%, and 10% by weight of dicyclohexylamine. In each instance, a composition stable at temperatures ranging from 0–42° C. for periods of time ranging from more than 3 months to more than 9 months were obtained.

*Example II*

To respective portions of a quantity of freshly distilled acid-free substantially anhydrous 2-thenyl chloride were added 0.5%, 1%, 2%, and 5% by weight of a mixture of N-alkyl-N-benzyl-cyclohexylamines in which the alkyl groups ranged from 8 to 18 carbon atoms. The resulting compositions were found to be stable at 5° C. for more than 9 months with substantially no tendency toward resinification.

*Example III*

To respective portions of freshly distilled acid-free 2-thenyl chloride containing 0.1% of moisture, were added 0.5%, 1%, 2% and 5% by weight of a mixture of N-alkyl-dicyclohexylamines in which the alkyl radicals ranged from 8 to 18 carbon atoms. After a period of more than 3 months, only a light brown color had developed in the composition and there was no evidence of resinification of the 2-thenyl chloride content of the composition.

*Example IV*

To respective portions of freshly distilled acid-free substantially anhydrous 2-thenyl chloride was added 2% by weight of one of the following amines: N-methyl-dioctylamine, didodecylamine, N-methyl-dicyclopentylamine, and dibenzylamine. The samples showed definite, marked stability against resinification but were not as thoroughly stabilized as the samples prepared in Example I. The compositions thus prepared can be stored at 5° C. for as long as 4 weeks without resinification.

*Example V*

To respective portions of freshly distilled acid-free substantially anhydrous 2-thenyl chloride was added 2% of one of the following amines: N-(2-ethylhexyl)-dibenzylamine, N-(2-ethylhexyl)-dicyclopentylamine, N-(2-ethylhexyl)-dicyclohexylamine, N-methyl-di-(alpha-naphthylmethyl)-amine, and N-benzyl-dioctylamine. Only a light brown color developed in the composition on prolonged storage, for example, at 25° C. for several months or longer. There was no evidence of resinification in the composition.

*Example VI*

For the purpose of the following preparation, a quantity of 2-thenyl chloride was employed which had been stored after preparation for 3 days at 5° C. This material had developed some free acidity. To a quantity of this material was added 1% by weight of dicyclohexylamine. The resulting composition was found to possess approximately ⅓ or less of the stability of a corresponding composition prepared from freshly distilled, acid-washed, substantially anhydrous 2-thenyl chloride and 1% of dicyclohexylamine. This stability was ascertained by the appearance of the sample over several weeks' time in storage at 5° C. It has been found feasible to utilize a composition of this type in those instances in which a stock of 2-thenyl chloride is to be employed in chemical reactions within a few weeks of the time at which the 2-thenyl chloride is prepared.

The novel compositions of the present invention, particularly when prepared from freshly distilled substantially anhydrous 2-thenyl chloride containing a trace or less of free acidity, have been found to be entirely satisfactory for use in chemical reactions without distilling the composition prior to such use. With the possible exception of a few instances in which the presence of the stabilizer might be considered undesirable in a reaction mixture involving 2-thenyl chloride, it is unnecessary to fractionate the composition of the present invention prior to its use in reactions. If such fractionation is deemed desirable, it has been found that there is substantially no evidence of a high boiling residue in the distillation flask after the distillation of any of the compositions of the present invention. This is additional evidence of the substantial absence of any tendency toward resinification of the novel compositions of the present invention.

*Example VII*

A quantity of 2-thenyl chloride was washed with a cold 5% aqueous solution of sodium bicarbonate and then with cold water until substantially neutral. The material was then dried over calcium chloride. To the dried, acid-free 2-thenyl chloride was added 2% of dicyclohexylamine. The resulting composition was found to be substantially free from resinification at the end of 9 months of storage at 5° C.

I claim:

1. A stable composition consisting of 2-thenyl chloride and a small portion of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

2. A stable composition consisting of 2-thenyl chloride and at least 0.5% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

3. A stable composition consisting of 2-thenyl chloride and 0.5–5% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

4. A stable composition consisting of 2-thenyl chloride and 0.5–10% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

5. A stable composition consisting of 2-thenyl chloride and 1–2% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

6. A stable composition consisting of 2-thenyl chloride and at least 0.5% of dicyclohexylamine.

7. A stable composition consisting of 2-thenyl chloride and 1–2% of dicyclohexylamine.

8. A stable composition consisting of 2-thenyl chloride and at least 0.5% of a mixture of N-alkyl-N-benzyl-cyclohexylamines in which the alkyl groups range from 8 to 18 carbon atoms.

9. A stable composition consisting of 2-thenyl chloride and at least 0.5% of a mixture of N-alkyl-dicyclohexylamines in which the alkyl groups range from 8 to 18 carbon atoms.

10. A process of stabilizing 2-thenyl chloride comprising incorporating therein a small portion of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

11. A process of stabilizing 2-thenyl chloride comprising incorporating therein at least 0.5% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

12. A process of stabilizing 2-thenyl chloride comprising incorporating in substantially neutral, freshly distilled 2-thenyl chloride a small portion of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

13. A process of stabilizing 2-thenyl chloride comprising incorporating in substantially neutral, freshly distilled 2-thenyl chloride at least 0.5% of dicyclohexylamine.

14. A process of stabilizing 2-thenyl chloride comprising adding to substantially neutral and salt free, freshly distilled 2-thenyl chloride a small quantity of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

15. A process of stabilizing 2-thenyl chloride comprising adding to substantially neutral and salt free, anhydrous 2-thenyl chloride at least 0.5% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

16. A process of stabilizing 2-thenyl chloride comprising adding to substantially neutral and salt free, freshly distilled 2-thenyl chloride at least 0.5% of an amine of the formula type:

in which R represents a radical selected from the group consisting of hydrogen, alkyl, cycloalkyl, and aralkyl radicals, $R_1$ and $R_2$ each represent a radical selected from the group consisting of alkyl radicals containing at least 8 carbon atoms, cycloalkyl radicals containing at least 5 carbon atoms in their ring structure and aralkyl radicals.

FERDINAND B. ZIENTY.

REFERENCES CITED

The following references are of record in the file of this patent:

Chemical Abstracts, 20: 390 (1926).